US010270968B2

(12) United States Patent
Shiraishi et al.

(10) Patent No.: US 10,270,968 B2
(45) Date of Patent: Apr. 23, 2019

(54) SURVEILLANCE CAMERA PACKING MEMBER

(71) Applicant: PANASONIC INTELLECTUAL PROPERTY MANAGEMENT CO., LTD., Osaka (JP)

(72) Inventors: Masaru Shiraishi, Fukuoka (JP); Minoru Hirata, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/754,383

(22) PCT Filed: Oct. 3, 2016

(86) PCT No.: PCT/JP2016/079262
§ 371 (c)(1),
(2) Date: Feb. 22, 2018

(87) PCT Pub. No.: WO2017/057772
PCT Pub. Date: Apr. 6, 2017

(65) Prior Publication Data

US 2018/0249071 A1 Aug. 30, 2018

(30) Foreign Application Priority Data

Oct. 1, 2015 (JP) ................................ 2015-195675
Sep. 28, 2016 (JP) ................................ 2016-189551

(51) Int. Cl.
*H04N 7/18* (2006.01)
*H04N 5/232* (2006.01)
(Continued)

(52) U.S. Cl.
CPC ....... *H04N 5/23225* (2013.01); *B65D 5/4204* (2013.01); *B65D 81/052* (2013.01);
(Continued)

(58) Field of Classification Search
CPC ............................ H04N 5/23225; B65D 85/38
(Continued)

(56) References Cited

U.S. PATENT DOCUMENTS

2007/0190818 A1* 8/2007 Barassi .................. B65D 85/68 439/69
2012/0319468 A1* 12/2012 Schneider ............... H04L 12/10 307/1

FOREIGN PATENT DOCUMENTS

EP 2 799 357 11/2014
JP 57-140799 9/1982
(Continued)

OTHER PUBLICATIONS

Official Communication issued in International Pat. Appl. No. PCT/JP2016/079262, dated Dec. 13, 2016, along with an English translation thereof.
(Continued)

*Primary Examiner* — Richard T Torrente
(74) *Attorney, Agent, or Firm* — Greenblum & Bernstein, P.L.C.

(57) ABSTRACT

The present invention facilitates the work of setting a surveillance camera (30) with the surveillance camera (30) in a packed and stacked state. A surveillance camera packing member (1) is composed of: a cushioning material (10) that has a cylindrical shape with one end open and that holds a case side surface (31) and a circular dome section (32) of a dome-type surveillance camera (30); and a packing box (20) formed by bending a corrugated board sheet to form a rectangular parallelepiped and that accommodates the cushioning material (10) in which the dome-type surveillance camera (30) is held, a perforated line (23) for forming a open window section (22) of predetermined size for removing a connector-equipped cable (40) being provided to a side
(Continued)

30a
22
37
61
25
21
20 surface (21) of the packing box (20) facing the casing back surface (33) of the accommodated dome-type surveillance camera (30).

7 Claims, 7 Drawing Sheets

(51) Int. Cl.
*B65D 85/38* (2006.01)
*B65D 81/05* (2006.01)
*H04N 7/10* (2006.01)
*B65D 5/42* (2006.01)

(52) U.S. Cl.
CPC ............. *B65D 85/38* (2013.01); *H04N 7/104* (2013.01); *H04N 7/181* (2013.01)

(58) Field of Classification Search
USPC .......................................................... 348/159
See application file for complete search history.

(56) References Cited

FOREIGN PATENT DOCUMENTS

| | | |
|---|---|---|
| JP | 2007-157041 | 6/2007 |
| JP | 2012-229044 | 11/2012 |
| JP | 2013-035573 | 2/2013 |
| WO | 2007/068079 | 6/2007 |

OTHER PUBLICATIONS

Office Action issued in Japanese Patent Application No. JP 2016-189551, dated Mar. 28, 2017 along with an English translation thereof.
Notice of Allowance issued in Japanese Patent Application No. JP 2016-189551, dated Jun. 27, 2017 along with an English translation thereof.

* cited by examiner

SURVEILLANCE CAMERA PACKING MEMBER

TECHNICAL FIELD

The present invention relates to a surveillance camera packing member for packaging a surveillance camera.

BACKGROUND ART

Conventionally, electronic equipments, such as surveillance cameras, are packaged while being supported by cushions individually, and are transported to installation locations (see Patent Literature (hereinafter referred to as "PTL") 1).

In addition, for surveillance cameras, there is work to be done for setting the surveillance cameras in accordance with the specifications depending on their installation locations, such as a condominium, shopping mall, and the like, before they are installed. Examples of such setting work include: work for setting differently between surveillance cameras used more frequently at night and those used more frequently in the daytime; work for presetting, for each of the surveillance cameras, storage for storing image data to be obtained by each of the surveillance cameras; and the like.

Such setting work is done at a place different from the installation locations by connecting each of the surveillance cameras to an external computer.

CITATION LIST

Patent Literature

PTL 1
Japanese Patent Application Laid-Open No. 2013-35573

SUMMARY OF INVENTION

Technical Problem

In a conventional packaging process, it has been necessary to take out a surveillance camera from a packaging member, perform setting work for the surveillance camera, and put the surveillance camera back in the packaging member after the setting work is finished. Accordingly, in a case where the setting work needs to be done for a large number (hundreds to thousands) of surveillance cameras, such as in a case where a plurality of surveillance cameras are installed in a broad area, such as in a shopping mall, the setting work takes long and is troublesome.

An object of the present invention is to provide a surveillance camera packaging member allowing setting work for surveillance cameras to be done easily in a state where the surveillance cameras are packaged and stacked up.

Solution to Problem

A surveillance camera packaging member according to the present invention is a surveillance camera packaging member adapted to hold and package a surveillance camera including a connectorized cable or a connector on a back surface of the surveillance camera facing away from a camera, and includes: a cushioning material adapted to hold the surveillance camera so that the connectorized cable or the connector is exposed; and a packaging box formed from a sheet of corrugated board folded to have a rectangular parallelepiped shape, the packaging box being adapted to house the cushioning material that holds the surveillance camera. In the surveillance camera packaging member, a perforation for forming an open window of a predetermined size is provided in a side surface of the packaging box, the side surface facing the back surface of the surveillance camera held by the cushioning material housed in the packaging box.

Advantageous Effects of Invention

According to the present invention, setting work for surveillance cameras can be done easily in a state where the surveillance cameras are packaged and stacked up.

DESCRIPTION OF EMBODIMENTS

Figure 1:
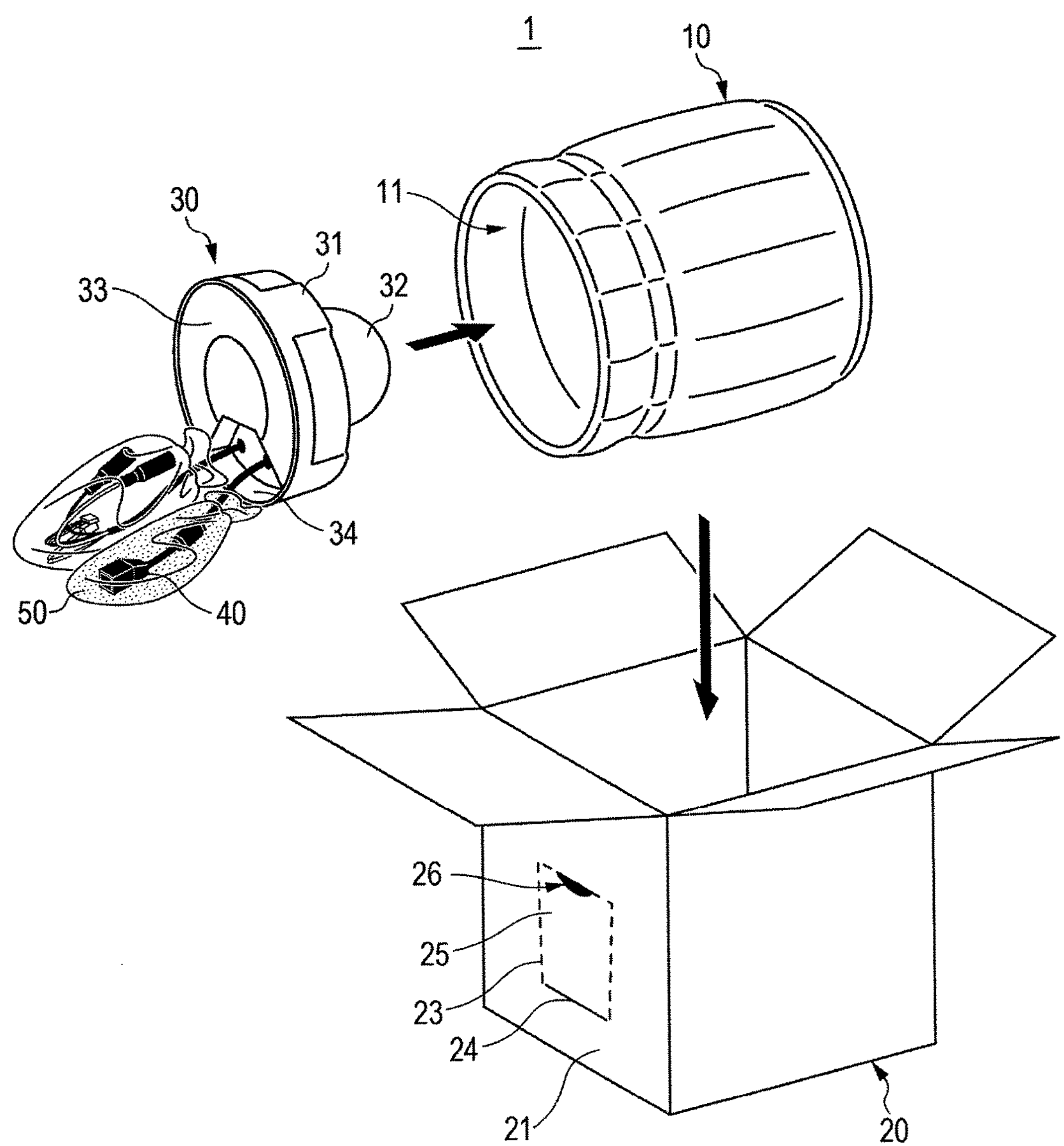
FIG. 1 is a perspective view of a surveillance camera packaging member according to an embodiment of the invention.

Hereinafter, an embodiment of the present invention will be described in detail with appropriate reference to the accompanying drawings.

<Configuration of Surveillance Camera Packaging Member>

A configuration of surveillance camera packaging member 1 according to the embodiment of the invention is described in detail below with reference to FIG. 1.

Surveillance camera packaging member 1 includes cushioning material 10 and packaging box 20.

Cushioning material 10 has a cylindrical shape and includes opening 11 at its one end. Cushioning material 10 is adapted to hold case side surface 31 and circular dome part 32 of dome-type surveillance camera 30. Cushioning material 10 is adapted to hold dome-type surveillance camera 30 while case back surface 33 (a surface facing away from the front at which a camera is provided) and connectorized cable (network cable) 40 that is wrapped in colored plastic bag 50 of dome-type surveillance camera 30 are exposed. Cushioning material 10 is formed by being inflated with air sent into the inside of cushioning material 10. Opening 11 of cushioning material 10 has an outer diameter of 20 cm and cushioning material 10 has a length of 22 cm in the direction of insertion of dome-type surveillance camera 30, for example.

Recess 34 is formed in case back surface 33 of dome-type surveillance camera 30, and connectorized cable 40 is partially exposed from recess 34 to the outside. Note that, in the example of FIG. 1, another connectorized cable (power and video cable) in addition to connectorized cable (network cable) 40 is exposed from recess 34 to the outside and is wrapped in a colored plastic bag of a color different from that of plastic bag 50 or in a colorless plastic bag.

Packaging box 20 is formed from a sheet of corrugated board folded to have a rectangular parallelepiped shape and can be opened and closed at its top. Side surface 21 of packaging box 20 faces case back surface 33 of dome-type surveillance camera 30 when dome-type surveillance camera 30 is housed in packaging box 20. Case back surface 33 of dome-type surveillance camera 30 faces away from circular dome part 32. Perforation 23 for forming open window 22 (see FIG. 2) of a predetermined size from which connectorized cable 40 is taken out, folding guide portion 24, fold piece 25 adapted to close open window 22, and gap 26 in which a finger is put for drawing fold piece 25 outward are formed at a portion of side surface 21 of packaging box 20 that is approximately central in the widthwise direction of side surface 21. Perforation 23 is formed such that a length between a part of perforation 23 that is parallel with folding guide portion 24 and the upper end of side surface 21 is greater than a length between folding guide portion 24 and the lower end of side surface 21.

Packaging box 20 has, as its inside dimensions, a length in the front-back direction, a height in the up-down direction, and a length in the left-right direction that allow cushioning material 10 to be held steadily. Cushioning material 10 holding dome-type surveillance camera 30 is put in packaging box 20 from the opened top of packaging box 20. Packaging box 20 is adapted to house cushioning material 10 holding dome-type surveillance camera 30.

<Method for Using Surveillance Camera Packaging Member>

A method for using surveillance camera packaging member 1 according to the embodiment of the invention is described in detail below with reference to FIGS. 2 and 3.

Figure 2A:
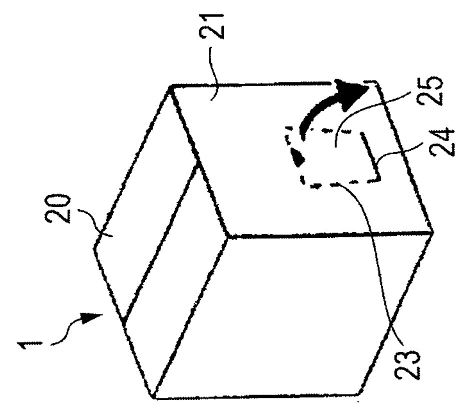
FIGS. 2A to 2F illustrate a method for using the surveillance camera packaging member according to the embodiment of the invention.
Figure 3:
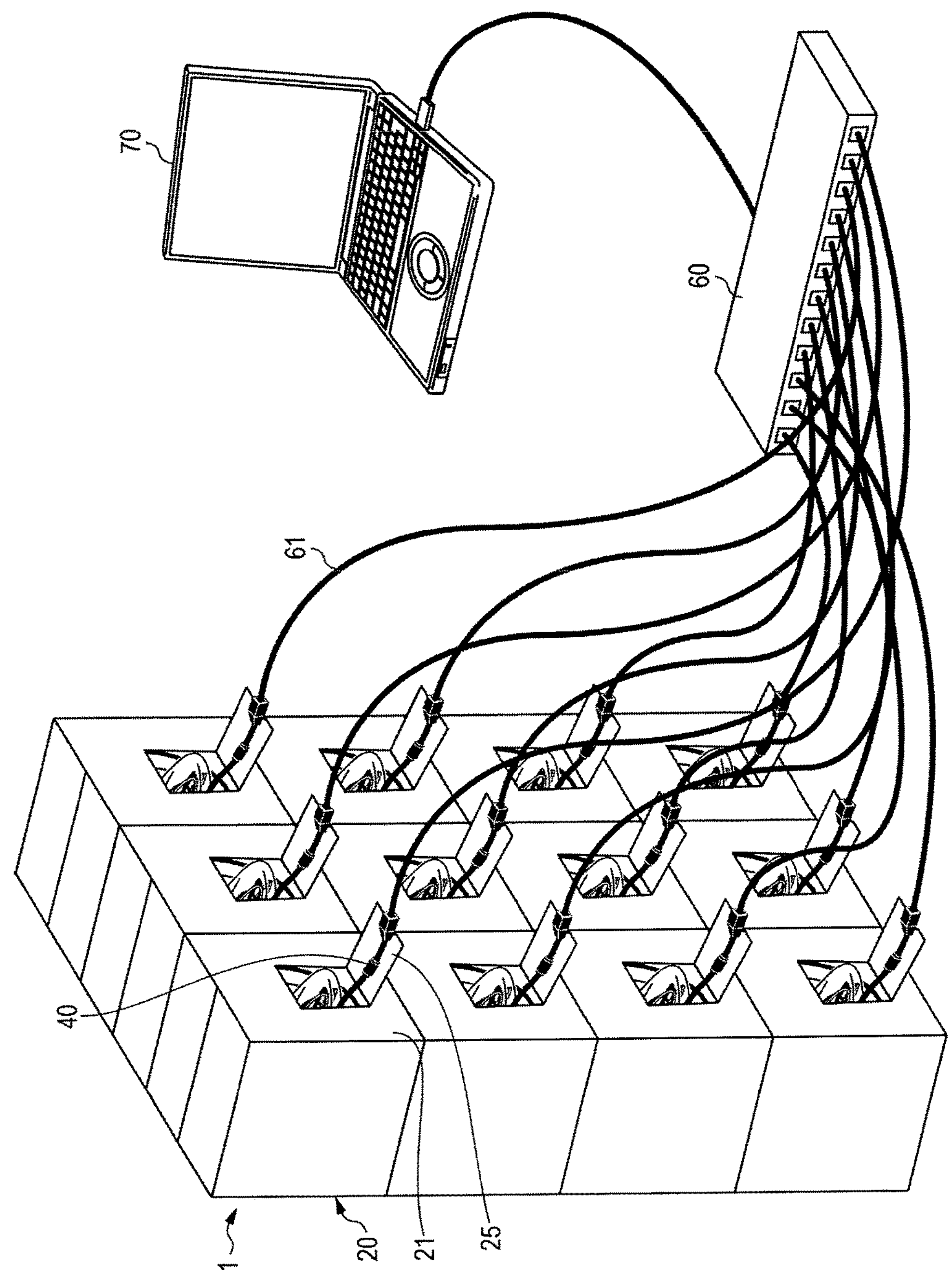
FIG. 3 illustrates a state where surveillance camera packaging members are being used when surveillance cameras housed in the surveillance camera packaging members according to the embodiment of the invention are set in accordance with predetermined specifications.

To begin with, a user forms open window 22 in side surface 21 by putting a finger into gap 26 formed in packaging box 20 in which cushioning material 10 that holds dome-type surveillance camera 30 is housed, pulling fold piece 25 outward while ripping fold piece 25 along perforation 23, and folding fold piece 25 along folding guide portion 24, as illustrated in FIG. 2A.

Figure 2B:
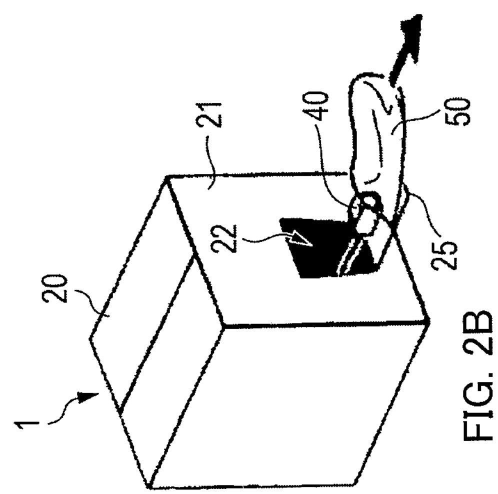

Next, the user pulls out, from open window 22 to the outside, connectorized cable 40 wrapped in plastic bag 50 exposed at open window 22, and removes plastic bag 50, as illustrated in FIG. 2B. At this time, fold piece 25 positioned substantially horizontal makes it possible to hold a connector part of connectorized cable 40 on fold piece 25.

Figure 2C:
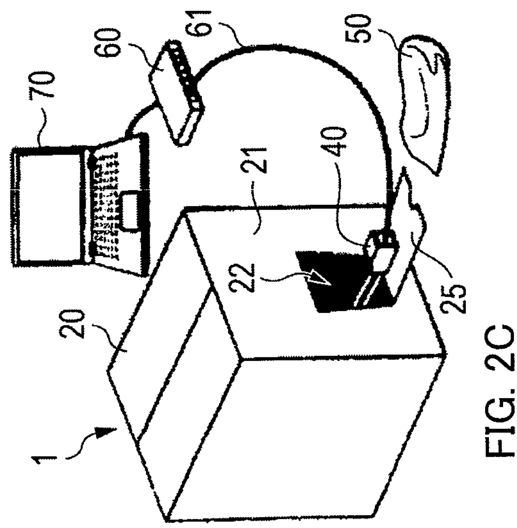

Next, the user connects connectorized cable 40 to external computer 70 via network cable 61 and router 60, as illustrated in FIG. 2C. The work described hitherto is done to a plurality of packaging boxes 20 in the state where the plurality of packaging boxes 20 are stacked up, as illustrated in FIG. 3. In the state illustrated in FIG. 3, the user sets (customizes) the specifications (resolutions, times, alarm conditions, and/or the like) of dome-type surveillance cameras 30. Open windows 22 are each formed at a portion of side surface 21 of packaging box 20 that is approximately central in the widthwise direction of side surface 21, and open windows 22 are each formed such that a length between the upper end of open window 22 and the upper end of side surface 21 is greater than a length between folding guide portion 24 and the lower end of side surface 21. Such open windows 22 each make it possible to ensure a sufficient strength allowing the shape of packaging box 20 to be maintained even when open windows 22 are formed in the state where surveillance camera packaging members 1 are stacked up.

Figure 2D:
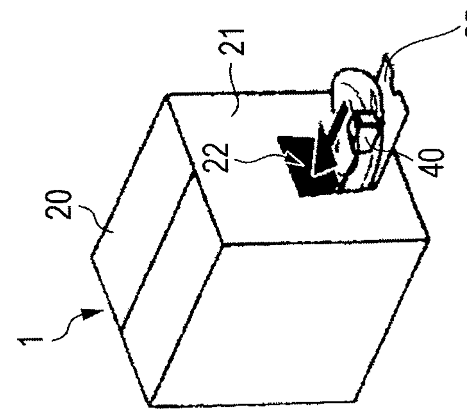

After the setting work for dome-type surveillance cameras 30 is finished, the user disconnects connectorized cables 40 from external computer 70, wraps connectorized cables 40 in plastic bags 50, and puts connectorized cables 40 wrapped in plastic bags 50 in the insides of packaging boxes 20 from open windows 22, as illustrated in FIG. 2D.

Figure 2E:
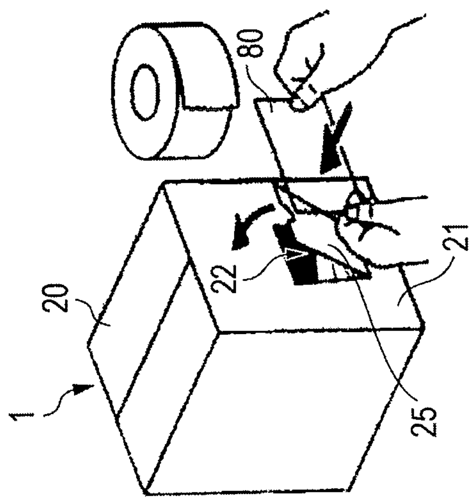

Next, the user raises fold pieces 25 upward from folding guide portions 24, and returns fold pieces 25 to their original positions, as illustrated in FIG. 2E.

Figure 2F:
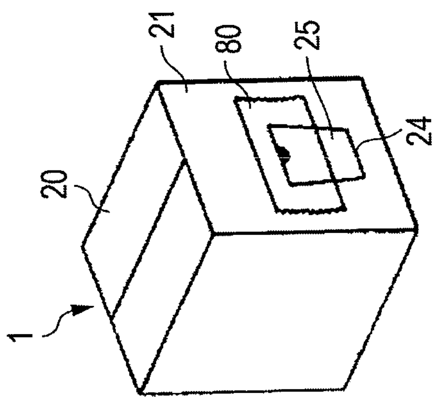

Then, the user closes open windows 22 with fold pieces 25 by holding fold pieces 25 and side surfaces 21 together with tape 80, as illustrated in FIG. 2F. In this way, dirt and dust can be prevented from entering the insides of packaging boxes 20.

As described above, in surveillance camera packaging member 1 according to the embodiment of the present invention, perforation 23 for forming open window 22 of a predetermined size from which connectorized cable 40 is taken out is provided in side surface 21 of packaging box 20 that houses cushioning material 10 that holds dome-type surveillance camera 30, in which case, side surface 21 faces case back surface 33 of dome-type surveillance camera 30. In this way, connectorized cable 40 can be taken out from open window 22 in the state where the surveillance cameras are packaged and stacked up, so that it is unnecessary to open packaging boxes 20 and to take out dome-type surveillance cameras 30 from packaging boxes 20 for the setting work for surveillance cameras 30, and thus, the setting work can be done easily.

<Variation 1>

Figure 4A:
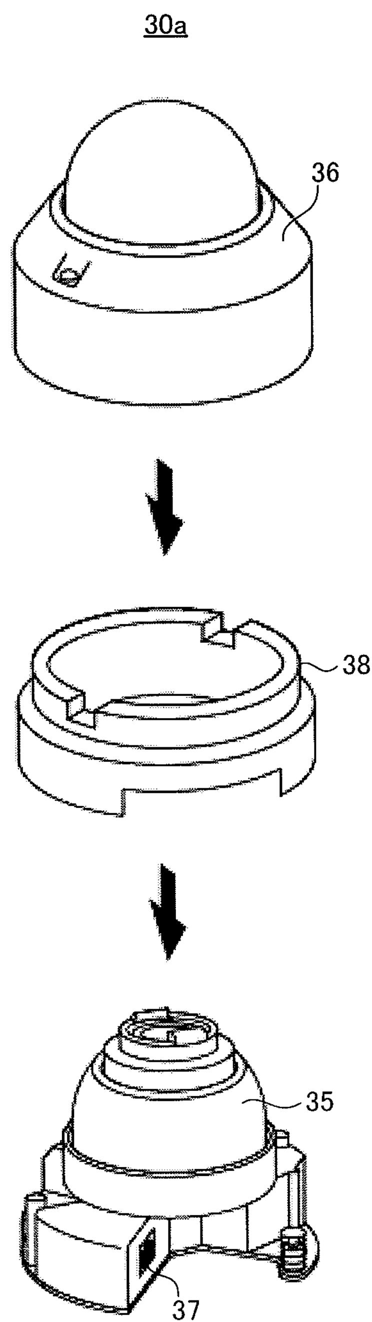
FIGS. 4A to 4C are perspective views of a dome-type surveillance camera according to Variation 1 of the embodiment of the invention.
Figure 4B:
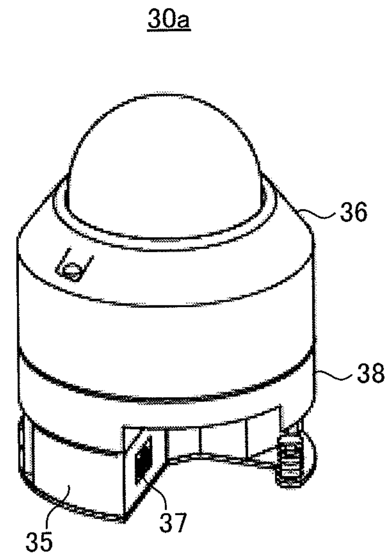
Figure 4C:
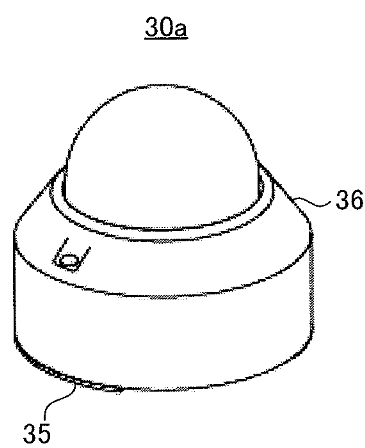

The present invention is also applicable to a case where dome-type surveillance camera 30*a* which, as illustrated in FIGS. 4A to 4C, does not have connectorized cable 40 is packaged. As illustrated in FIGS. 4A to 4C, dome-type surveillance camera 30*a* is composed of main body part 35 and circular-dome-part cover 36. Main body part 35 is provided with connector 37.

As illustrated in FIGS. 4A and 4B, intermediate pad 38 serving as a cushioning material is inserted between main body part 35 and circular-dome-part cover 36 when dome-type surveillance camera 30*a* is packaged. In this state, main body part 35, circular-dome-part cover 36, and intermediate pad 38 are fixed with adhesive tape or the like.

Note that, as illustrated in FIG. 4C, dome-type surveillance camera 30*a* is used after intermediate pad 38 is removed and after circular-dome-part cover 36 is put on main body part 35.

In Variation 1, cushioning material 10 is adapted to hold the side surface of intermediate pad 38 of dome-type surveillance camera 30*a* and circular-dome-part cover 36 while connector 37 is exposed.

As illustrated in FIG. 1, perforation 23 for forming open window 22 of a predetermined size, folding guide portion 24, fold piece 25 that closes open window 22, and gap 26 in which a finger is put for drawing fold piece 25 outward are formed at a portion of side surface 21 of packaging box 20 that is approximately central in the widthwise direction of side surface 21.

Packaging box 20 has, as its inside dimensions, a length in the front-back direction, a height in the up-down direction, and a length in the left-right direction that allow cushioning material 10 to be held steadily. Cushioning material 10 that holds dome-type surveillance camera 30*a* is put in packaging box 20 from the opened top of packaging box 20. Packaging box 20 is adapted to house cushioning material 10 that holds dome-type surveillance camera 30*a*.

Figure 5:
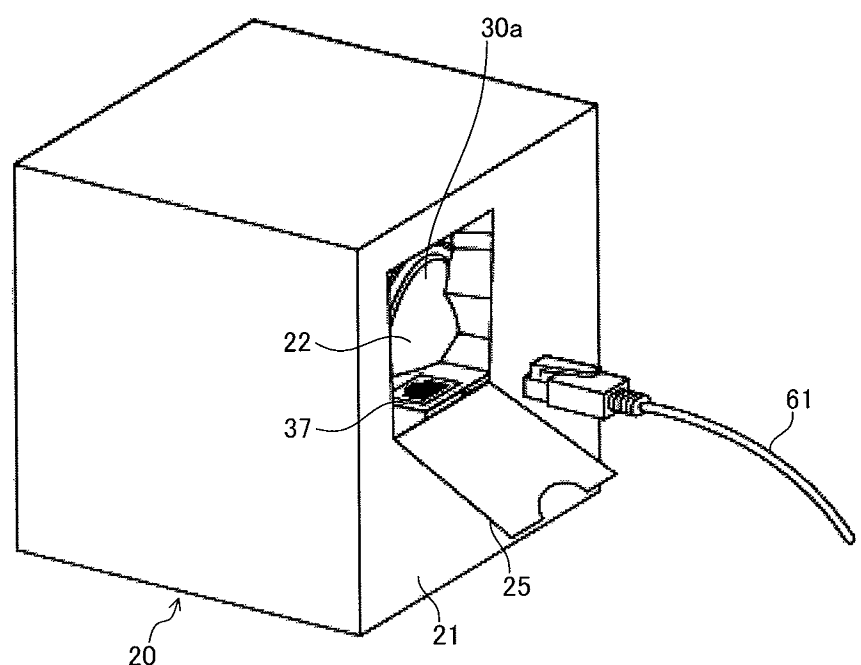
FIG. 5 illustrates a method for using a surveillance camera packaging member according to Variation 1 of the embodiment of the invention.

When a user performs the work related to setting the specifications of dome-type surveillance camera 30*a*, the user forms open window 22 in side surface 21 by putting a finger into gap 26 formed in packaging box 20, pulling fold piece 25 outward while ripping fold piece 25 along perforation 23, and folding fold piece 25 along folding guide portion 24 (see FIG. 5).

At this time, connector 37 is exposed at open window 22, as illustrated in FIG. 5. Therefore, it is possible for the user to connect network cable 61 to connector 37 easily, and to perform the setting work for dome-type surveillance camera 30*a*. Note that, it is possible also in Variation 1 to perform the setting work in the state where packaging boxes 20 are stacked up as illustrated in FIG. 3.

After the setting work for dome-type surveillance cameras 30*a* is finished, the user raises fold pieces 25 upward from folding guide portions 24, returns fold pieces 25 to their original positions, and closes open windows 22 with fold pieces 25 by holding fold pieces 25 and side surfaces 21 together with tape 80, as illustrated in FIGS. 2A to 2F. In this way, dirt and dust can be prevented from entering the insides of packaging boxes 20.

As described above, it is unnecessary also in dome-type surveillance camera 30*a* not having connectorized cable 40 to take out dome-type surveillance camera 30 from packaging box 20 for the setting work for surveillance camera 30*a*, and thus, the setting work can be done easily.

<Variation 2>

Figure 6:
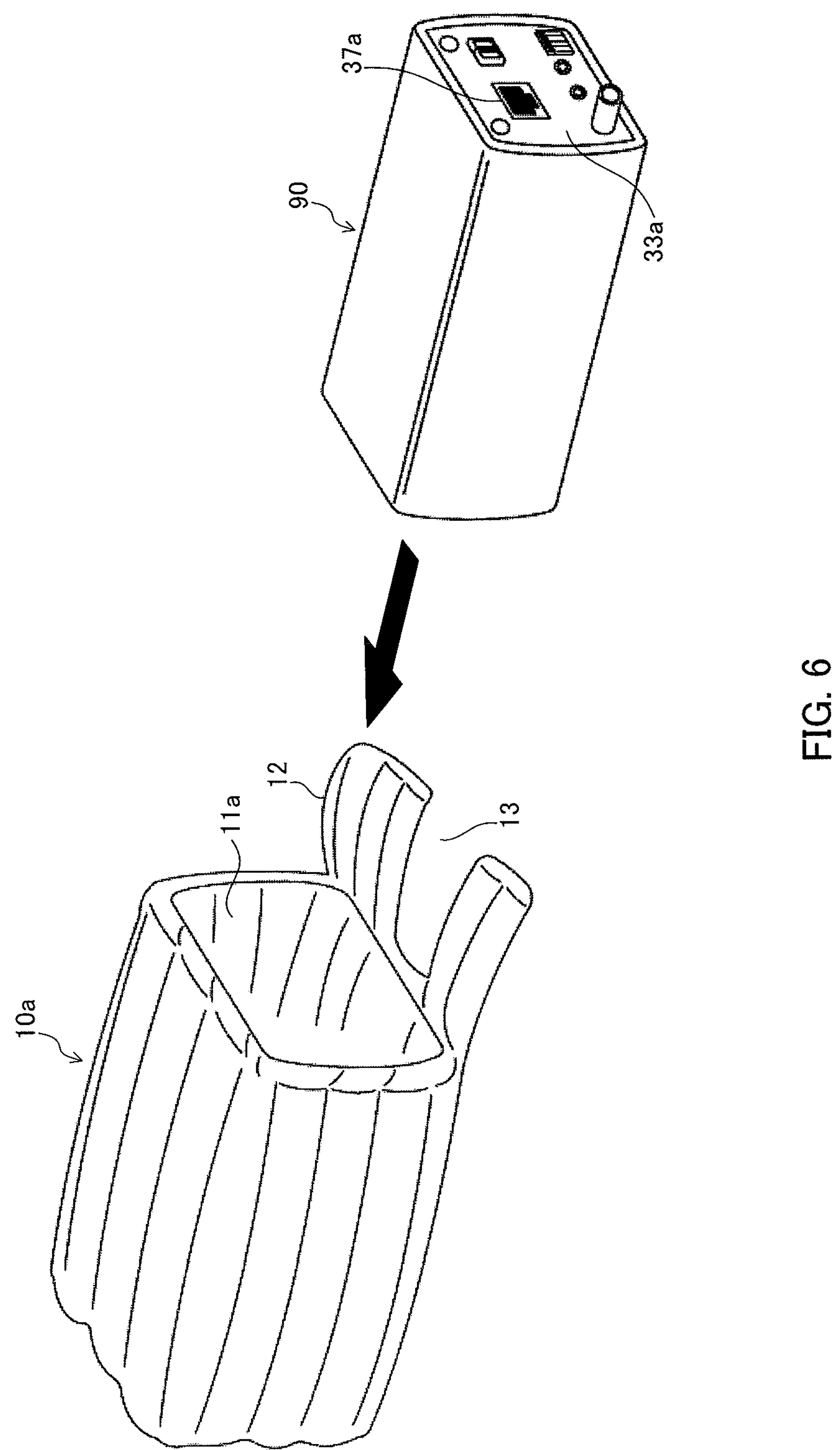
FIG. 6 is a perspective view of a surveillance camera and a cushioning material according to Variation 2 of the embodiment of the invention.

The present invention is also applicable to a case where surveillance camera 90 of a type other than a dome type, as illustrated in FIG. 6, is packaged. As illustrated in FIG. 6, surveillance camera 90 is substantially rectangular and is provided with connector 37*a* at case back surface 33*a* of surveillance camera 90.

In Variation 2, cushioning material 10*a* is formed by being inflated with air sent into the inside of cushioning material 10*a*, has a rectangular cylindrical shape including an interior space in which surveillance camera 90 can be housed, and includes opening 11*a* at its one end. Lid portion 12 is attached to one side of the end at which opening 11*a* is formed. Cutout 13 is formed in lid portion 12 so that connector 37*a* should be exposed when open window 22 is formed in packaging box 20 that houses cushioning material 10*a* that holds surveillance camera 90.

As illustrated in FIG. 1, perforation 23 for forming open window 22 of a predetermined size, folding guide portion 24, fold piece 25 that closes open window 22, and gap 26 in which a finger is put for drawing fold piece 25 outward are formed at a portion of side surface 21 of packaging box 20 that is approximately central in the widthwise direction of side surface 21.

Packaging box 20 has, as its inside dimensions, a length in the front-back direction, a height in the up-down direction, and a length in the left-right direction that allow cushioning material 10*a* to be held steadily. Cushioning material 10*a* that holds surveillance camera 90 is put in packaging box 20 from the opened top of packaging box 20. Packaging box 20 is adapted to house cushioning material 10*a* that holds surveillance camera 90. At this time, cushioning material 10*a* is housed in packaging box 20, with lid portion 12 closed. In this way, surveillance camera 90 is protected by cushioning material 10*a* from an impact in all the directions.

Figure 7:
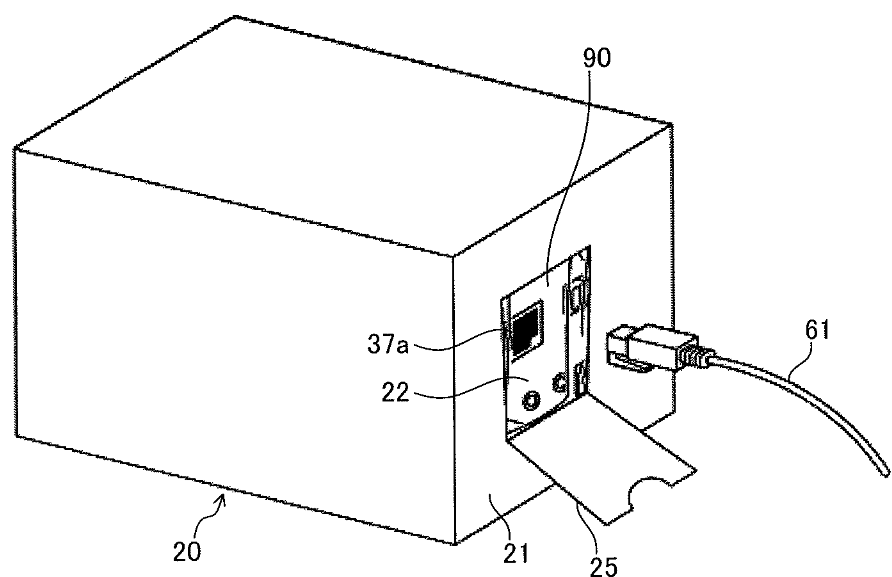
FIG. 7 illustrates a method for using a surveillance camera packaging member according to Variation 2 of the embodiment of the invention.

When a user performs the work related to setting the specifications of surveillance camera 90, the user forms open window 22 in side surface 21 by putting a finger into gap 26 formed in packaging box 20, pulling fold piece 25 outward while ripping fold piece 25 along perforation 23, and folding fold piece 25 along folding guide portion 24 (see FIG. 7).

At this time, connector 37*a* is exposed at open window 22, as illustrated in FIG. 7. Therefore, it is possible for the user to connect network cable 61 to connector 37*a* easily, and to perform the setting work for surveillance camera 90. Note that, it is possible also in Variation 2 to perform the setting work in the state where packaging boxes 20 are stacked up as illustrated in FIG. 3.

After the setting work for surveillance cameras 90 is finished, the user raises fold pieces 25 upward from folding guide portions 24, returns fold pieces 25 to their original positions, and closes open windows 22 with fold pieces 25 by holding fold pieces 25 and side surfaces 21 together with tape 80, as illustrated in FIGS. 2A to 2F. In this way, dirt and dust can be prevented from entering the insides of packaging boxes 20.

As described above, it is unnecessary also in surveillance camera 90 of a type other than the dome type to take out surveillance camera 90 from packaging box 20 for the setting work for surveillance camera 90, and thus, the setting work can be done easily.

The present invention is by no means limited to the types or arrangement of members or the number of members mentioned in the embodiments described above, and modification, such as replacing components used in the embodiments with components that bring about similar effects, can be made as appropriate to the present invention without departing from the spirit and scope of the present invention.

The present patent application claims the benefits of priorities based on Japanese Patent Application No. 2015-195675 filed on Oct. 1, 2015 and Japanese Patent Application No. 2016-189551 filed on Sep. 28, 2016. The disclosures of the specifications, drawings and abstracts of these Japanese Patent Applications are incorporated in the specification of the present application by reference in their entirety.

INDUSTRIAL APPLICABILITY

A surveillance camera packaging member according to the present invention is suitable for packaging a surveillance camera.

REFERENCE SIGNS LIST

1 Surveillance Camera Packaging Member
10, 10*a* Cushioning Material
11, 11*a* Opening
20 Packaging Box
21 Side Surface
22 Open Window
23 Perforation
24 Folding Guide Portion
25 Fold piece
26 Gap
30, 30*a* Dome-Type Surveillance Camera
31 Case Side Surface
32 Circular Dome Part
33, 33*a* Case Back Surface

34 Recess
35 Main Body Part
36 Circular-Dome-Part Cover
37, **37*a*** Connector
38 Intermediate Pad
40 Connectorized Cable
50 Plastic Bag
60 Router
61 Network Cable
70 External Computer
80 Tape
90 Surveillance Camera

The invention claimed is:

1. A surveillance camera setting system configured to set a specification of a plurality of surveillance cameras, each of the surveillance cameras including a connectorized cable at a back surface of a surveillance camera, the back surface facing away from the surveillance camera, the surveillance camera setting system comprising:

a plurality of packaging boxes configured to package the plurality of surveillance cameras, respectively;

a computer configured to set the specification for each of the plurality of surveillance cameras; and a router configured to connect the connectorized cable of each of the plurality of surveillance cameras to the computer, wherein the specification includes at least one of a resolution, time and alarm condition, each of the plurality of packaging boxes is provided with a perforation for forming a foldable window of a predetermined size on a side surface of a packaging box, the foldable window being configured to be in an open position or a closed position, and the side surface facing the back surface of a corresponding one of the plurality of surveillance cameras that are packaged in the plurality of packaging boxes, respectively, the router connects the connectorized cable to the computer in a state where the plurality of packaging boxes are stacked up with the foldable window of each of the plurality of packaging boxes being in the open position, and the connectorized cable is flexible and drawn out from the foldable window in each of the plurality of packaging boxes, and when the specification of the surveillance camera is set, the connectorized cable is placed on or above a fold piece of the foldable window while the fold piece is positioned substantially horizontal.

2. The surveillance camera setting system according to claim 1, wherein the specification to be set for each of the plurality of surveillance cameras differs for each of the plurality of surveillance cameras.

3. The surveillance camera setting system according to claim 1, wherein the foldable window is substantially rectangular, and the perforation is provided in an upper side and in both lateral sides of the foldable window, the foldable window is formed by folding the fold piece along a folding guide portion, the fold piece being formed by cutting the packaging box along the perforation, the folding guide portion being a lower side of the foldable window.

4. The surveillance camera setting system according to claim 1, wherein the connectorized cable is a data cable for setting the specification of the surveillance camera.

5. The surveillance camera setting system according to claim 1, wherein the connectorized cable is has a female end that is connectable with a data cable extending from the router.

6. The surveillance camera setting system according to claim 1, wherein the foldable window physically supports the connectorized cable when the connectorized cable is connected with the router.

7. A surveillance camera setting method for setting a specification of a plurality of surveillance cameras in a state where the plurality of surveillance cameras are packaged respectively in a plurality of packaging boxes, each of the plurality of surveillance cameras including a connectorized cable at a back surface of a surveillance camera, the back surface facing away from the surveillance camera, the surveillance camera setting method comprising:

forming a foldable window in each of the plurality of packaging boxes that are stacked up, the foldable window being formed by cutting each of the plurality of packaging boxes along a perforation provided on a side surface of a packaging box, the foldable window being configured to be in an open position or a closed position, and the side surface facing the back surface of a corresponding one of the plurality of surveillance cameras that are packaged in the plurality of packaging boxes, respectively;

connecting, to a computer via a router, the connectorized cable that is flexible and drawn out from the foldable window in the open position of each of the plurality of packaging boxes; and setting the specification for each of the plurality of surveillance cameras using the computer, wherein the specification includes at least one of a resolution, time and alarm condition, and when the specification of the surveillance camera is set, the connectorized cable is placed on or above a fold piece of the foldable window while the fold piece is positioned substantially horizontal.

* * * * *